United States Patent [19]

Ando et al.

[11] 4,297,714
[45] Oct. 27, 1981

[54] THERMAL PEN

[75] Inventors: Kazunari Ando, Tajimi; Hirokazu Matsunaga, Tsushima; Hideaki Ayabe, Tokyo, all of Japan

[73] Assignees: Nippon Toki Kabushiki Kaisha, Nagoya; Watanabe Instruments Corp., Tokyo, both of Japan

[21] Appl. No.: 71,035

[22] Filed: Aug. 30, 1979

Related U.S. Application Data

[63] Continuation of Ser. No. 853,874, Nov. 22, 1977, abandoned.

[30] Foreign Application Priority Data

Apr. 5, 1977 [JP] Japan .............................. 52-42519[U]

[51] Int. Cl.³ ............................................ G01D 15/10
[52] U.S. Cl. ............................... 346/139 C; 346/76 R
[58] Field of Search ............ 346/76 R, 76 PH, 139 C; 219/216

[56] References Cited

U.S. PATENT DOCUMENTS

| 2,474,312 | 6/1949 | Halpern | 346/139 C |
| 3,478,191 | 4/1969 | Johnson | 346/76 R X |
| 3,699,588 | 10/1972 | Warrington | 346/139 C |
| 3,813,677 | 5/1974 | Shimotsuma | 346/76 R |
| 4,016,572 | 4/1977 | Hubbard | 346/139 C |

Primary Examiner—Joseph W. Hartary
Attorney, Agent, or Firm—Fleit & Jacobson

[57] ABSTRACT

A thermal pen of thick film type comprises a thermal pen tip and a thermal pen tip holder connected to the thermal pen tip for holding the thermal pen tip. The thermal pen tip comprises a high resistance substrate formed in the form of a pen point, a heater element formed in the form of a thick film on the end of the pen point of the high resistance substrate and an electric conductor formed in the form of a thick film so as to connect to the heater element. The thermal pen tip is preferably provided with a heat-resistant protective coating to cover the end of the pen point. A heat- and wear-resistant heat-sensitive recording piece is preferably provided in a heat conductive relation to said heater element.

8 Claims, 11 Drawing Figures

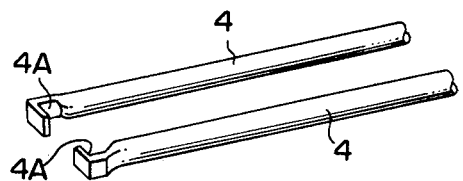
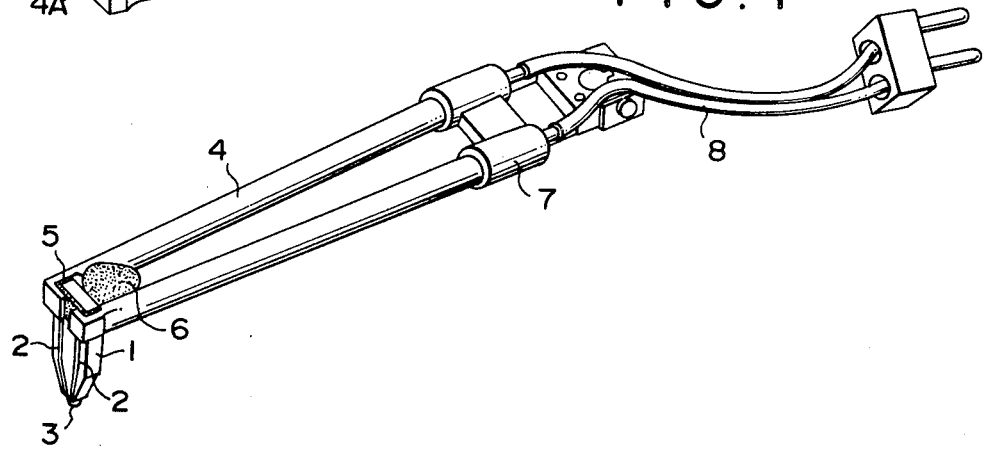
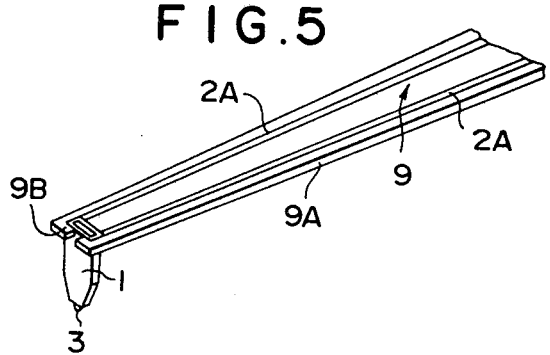
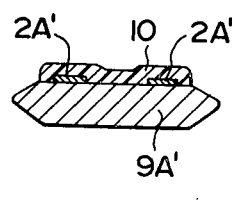
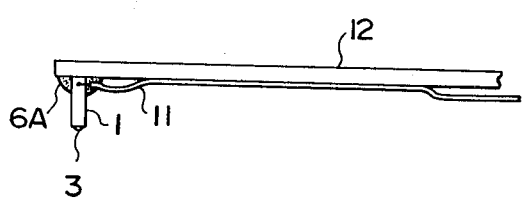
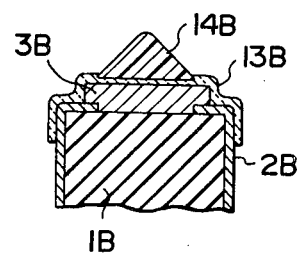

THERMAL PEN

This is a continuation of application Ser. No. 853,874, filed Nov. 22, 1977 now abandoned.

BACKGROUND OF THE INVENTION

1. Field of the Invention

This invention is concerned with a thermal pen for a heat-sensitive recorder which records an analog signal heat-sensitivity directly on a thermal paper or the like.

2. Description of the Prior Art

A pen device of ink type now in use for recorders such as a measuring instrument or the like has some disadvantages in respect of stability of recording such as choking up, too much supply and spilling of the ink. A recording system by means of a thermal pen has been widely used instead of the recording of ink system. Most of thermal pens used in the thermal pen recording system make use of a heating element such as nichrome wire or the like and therefore are not satisfactory in respect of structures, working life, consumed electric power, speed of thermal response and so on.

An object of the present invention is to remove the disadvantages of the prior art recording pen as above-mentioned and to provide a thermal pen capable of recording at high speed by application of AC voltage or DC voltage continuously or intermittently.

SUMMARY OF THE INVENTION

According to the present invention, there is provided a thermal pen of thick film type comprising a thermal pen tip and a thermal pen tip holder coupled to said thermal pen tip for holding the thermal pen tip, said thermal pen tip having a high resistance substrate formed in the form of a pen point, a heater element formed in the form of a thick film on the pen point of the high resistance substrate and an electric conductor formed in the form of a thick film so as to connect to the heater element of the high resistance substrate.

According to the invention, it is preferable to apply to the thermal pen tip a heat resistant film to cover the pen point.

According to the invention, it is also preferable to provide a heat- and wear-resistant piece for heat-sensitive recording in a thermal conductive relation to the heater element.

The present invention will now be described in detail in respect of embodiments thereof by reference to accompanying drawings wherein:

BRIEF DESCRIPTION OF THE DRAWINGS

FIG. 3 is a perspective view of a part of a pair of pipe structures constituting a thermal pen tip holder of the thermal pen according to the invention;

FIG. 4 is a perspective view of an example of the whole structure of the thermal pen according to the invention;

FIG. 5 is a perspective view of a part of the thermal pen tip holder as another embodiment of the invention;

FIG. 6 is a sectional view illustrating the sectional configuration of another holder which is also advantageous when applied to such a holder of the type as shown in FIG. 5;

FIG. 7 is a schematic side view of another embodiment of the thermal pen holder according to the invention; and FIG. 8 is a sectional view of a part of a thermal pen tip as still another embodiment of the invention.

DESCRIPTION OF THE PREFERRED EMBODIMENTS

Figure 1A:
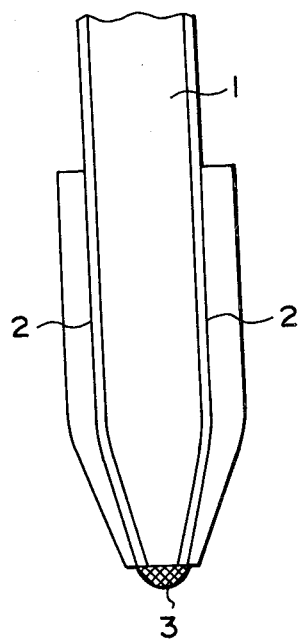
FIG. 1(A) is a front view of a part of a thermal pen tip as an embodiment of the present invention.
Figure 1B:
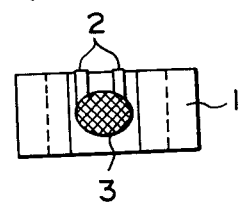
FIG. 1(B) is a bottom view of the part shown in FIG. 1(A)

Referring now to FIGS. 1(A) and 1(B), there is illustrated an example of a tip of a thermal pen according to the present invention in which a high resistance substrate 1 such as alumina or steatite substrate made in the form of a pen point is provided at its tip surface with a heater element 3 in the form of for example a point by screen printing and sintering of a resistor material of thick film type which is not thermally attackable. An electrically conductive layer 2 which is an electrical conductor for supplying a current to the heater element 3 continuously or intermittently extends over the tip surface having the heater element 3 mounted thereon and a lateral side of the substrate 1 and the respective ends are connected to the heater element 3.

Figure 2A:
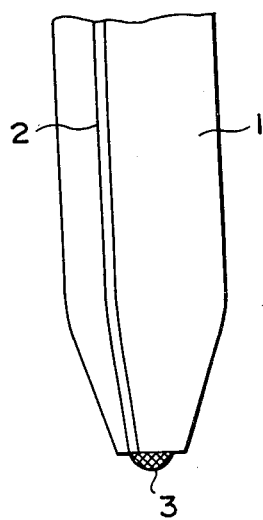
FIG. 2(A) is a front view of a part of a thermal pen tip as another embodiment of the invention.
Figure 2B:
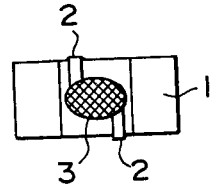
FIG. 2(B) is a bottom view of the part shown in FIG. 2(A)
Figure 2C:
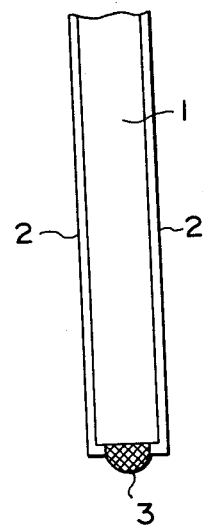
FIG. 2(C) is a side view of the part shown in FIG. 2(A)

In the embodiment of FIG. 1, the conductive layer 2 which provides an electric conductor for supply and return is positioned on one side of the substrate 1, however, the conductive layer 2 may be positioned on either lateral sides of the substrate 3 as shown in the FIG. 2(A) being a partial front view, FIG. 2(B) being a bottom view and FIG. 2(C) being a side view. In FIG. 2, the same components as appearing in the embodiment of FIG. 1 are designated by like reference numerals.

It is also to be noted that the configuration of the heater element 3 should not be limited to a point, but should be arbitrarily selected.

FIG. 3 depicts in a perspective manner a part of a pair of pipe structures 4 which form a part of the thermal pen tip holder for mounting the thermal pen tip thereon. These pipe structures 4 serve to hold the thermal tip pen and to provide an electric path. The pipe structures 4 are by way of example made of an aluminum pipe as an electric conductor coated on its outer side with an insulating material such as epoxy resin or the like. Each pipe 4 has its tip exposed and is provided at its end with a bent portion 4A adapted to embrace the thermal pen tip and to make contact with the conductive layer 2 of the thermal pen tip.

For example, the thermal pen tip as shown in FIG. 1 is assembled with the pair of pipe structures as shown in FIG. 3 to form a thermal pen according to the embodiment of the invention shown in FIG. 4 as a perspective view. The thermal pen tip having the substrate 1 with the conductive layer 2 and the heater element 3 applied thereto as shown in FIG. 1 is put between the bent portions 4A, 4A at the tips of the pair of pipe structures, 4, 4 as shown in FIG. 3 in such a manner that the conductive layer 2 of the substrate 1 makes contact with the tip of the pipe. The thermal pen tip is clamped on the aluminum pipe with or without the aid of a heat-resistant electrically conductive resin 5 and then reinforced by a reinforcing material 6. The opposite ends of the pipe structure 4 are held by a pipe holder 7 and connected to electric wires 8, 8.

Materials of the pipe structures 4 are not limited to aluminum, but may be any conductive metallic material which is as light as possible.

Instead of using the pipe structure as explained with respect to FIG. 3, another structure in which a thin lead-in wire of the order of 0.3 mm is soldered to the thermal pen tip and the lead-in wire is passed inside or on the lateral side of a pipe may be used. In this case, the pipe may be made of either metal or resin. A pipe having a circular section is much preferred because it is unlikely that such pipe is subjected to the influence of wind pressure at a high speed running. In an ordinary use, a structure having a polygonal section such as a quadrilateral section may be used.

FIG. 5 is a perspective view of a part of another embodiment of the invention according to which the thermal pen tip is mounted on the tip holder of another pen. The tip holder 9 for the thermal pen of FIG. 5 is manufactured by machining a printed wire board made of a glass-epoxy material. At the tip of the printed substrate 9A made of a glass-epoxy material is formed a mounting portion 9B into which the thermal pen tip having an insulating substrate 1 with the heater element 3 mounted thereon is put, and a predetermined conductor pattern 2A connecting the conductive layer of the thermal pen tip is formed on one side of the substrate 9A including through holes. Then an insulating coating is applied to the desired portion (not shown). The thermal pen tip is clamped on the mounting portion 9B at the tip of the holder 9 with or without the aid of a conductive resin and the thermal pin tip is reinforced by a heat-resistant resin (FIG. 5 illustrates no state of reinforcement).

Materials of the printed substrate 9A is not limited to a glass or an epoxy resin (plastics), but may be for example phenol resin (plastics) or the like which is as strong as possible. A cross section of the printed substrate 9A is not limited to the configuration shown in FIG. 5, but is preferably of such configuration as to receive less wind pressure thereon. The base plate 9A' shown in cross section in FIG. 6 may preferably be used. In FIG. 6, reference numeral 2A' designates a conductor pattern disposed on the upper surface of the substrate 9A' and reference numeral 10 designates an insulating coating applied to the appropriate portion as desired. A holder in which materials are cut out at portions requiring no considerable mechanical strength may be used to provide a lighter structure.

FIG. 7 illustrates another embodiment in which use is made of a sheet material incapable of conductive printing as a substrate of a holder. In this particular embodiment, the thermal pen tip having the insulating substrate 1 with the heater element 3 mounted on the tip thereof is secured to one end of the sheet material 12 incapable of conductive printing and then reinforced at 6A. A thin lead-in wire 11 is soldered to the thermal pen tip.

In order to enable minute recording, it is preferable to form in advance a heat-resistant paste absorbing member under the heating resistor and the electric conductor so as to provide uniform and fine printing. There is thus provided a thermal pen tip suitable for minute recording. Heating effect can be improved by selecting the absorbing member as above-mentioned which is made of a material inferior in thermal conductivity to the substrate of the thermal pen tip.

It is preferred that the thermal pen tip of the thermal pen according to the invention has a wear-resistant material (heat-resistant protective film) coated on a part of the heater element and the conductor for improvement of wear resistant performance against a heat sensitive material in a practical use.

FIG. 8 illustrates another embodiment of the thermal pen tip for the thermal pen of the invention. The thermal pen tip shown therein is such that a conductive layer 2B is provided on each side of a high resistant substrate 1B and a heater element 3B is provided on the end surface of the high resistant substrate 1B to bridge the both conductive layers 2B, 2B and an adhesive layer 13B is applied to the heater element 3B. On the top surface of the adhesive layer 13B is secured in a heat conductive relation thereto a piece 14B for heat-sensitive recording which is made of a heat conductive, heat-resistant and wear-resistant thin metal or ceramics of a given configuration, is generally triangular in section and of conical body and has a tip of recording width. In the embodiment shown in FIG. 8, use has been made of a heat-sensitive recording piece 14B in the form of a conical body, however, it is possible to effect thermal recording with a desired width of line by employing a body of semispherical or columnar shape, a square pillar or a flat plate instead of the conical body. In addition, with the thermal pen utilizing the thermal pen tip shown in FIG. 8, the heat-sensitive recording piece 14B has a tip in the form of a point and it is possible to realize recording with uniform recording width without any interruption of recording in spite of rightward or leftward inclination of the thermal pen at the time of movement thereof at a high speed. With the thermal pen utilizing the thermal pen tip as shown in FIG. 8, no difference is made in width of a line of a heat-sensitive recording curve in various directions, and therefore the thermal pen is suitable for use in an X-Y plotter and an X-Y recorder and particularly for recording with as thin line as less than 0.2 mm.

An experiment for long time recording was conducted under pulsing drive by application of 24 volts, using the thermal pen shown as an embodiment of the invention in FIG. 4 and a thermal paper capable of coloring at the temperature of 70° to 90° C. with the heater element 3 having resistance value of about 200 ohms. The thermal time constant required for rise of heating temperature up to 300° to 400° C. resulted in the order of 20 to 30 milliseconds and good thermal recording was obtained. Extent of wear-resistance of the surface of the heater element 3 of the thermal pen of FIG. 4 can be improved by coating the surface with a special hard glass as a wear-resistant material. As the result of the experiment, there was no change in resistance value even after tracing of 580 Km with the pen pressure of 20–30 g and wear-resistant performance was normal. Drawing performance was obtained with a pen pressure of the order of 10 g, at the amplitude of the order of 3 cm and at frequency of 100 Hz. When these results of the experiment is compared with the performance of a conventional thermal pen utilizing a nichrome wire as a heating body, it is found that the thermal pen of the present invention is superior in the following respects;

(a) Consumption of electric power

Electric power consumed in the conventional thermal pen is relatively large while electric power consumed in the thermal pen according to the invention is small.

(b) Time required to reach a given temperature (thermal time constant):

The time required in the conventional thermal pen is 3 to 5 seconds while the time required in the invention is of the order of 20 to 30 milliseconds. Improvement of about 100 times over the conventional thermal pen is attained.

(c) Wear-resistant performance

The conventional thermal pen can stand only drawing of a length of several tens of kilometers with a pen pressure of 20 to 30 g while the thermal pen of the invention can stand drawing of a length of more than 500 kilometers under the same condition. Thus the latter has wear-resistant performance of about 10 times of the former.

(d) Recording performance

The thermal pen according to the invention is capable of control of a pen speed by an epoch-making improvement in thermal time constant as above-mentioned and enables recording with a pen pressure of about 10 g, at the amplitude of 3 cm and at frequency of 100 Hz. Drawing speed reaches even up to 10 m/sec. On the contrary, the prior art thermal pen is incapable of electronic control and permits only drawing of the amplitude up to 3 cm and of the frequency of 20 Hz to ensure characteristics of recording of like quality.

As seen in the foregoing, the thermal pen of thick film type according to the present invention is easy to manufacture and enables direct recording of data on a heat-sensitive material at a high speed by making use of heating of a heater element and precludes various problems inherent in the prior art recording device of ink type. Moreover, immediate filing of recorded material is permitted and complicate management of recorded materials is not needed, whereby easy handling is assured. There is attained a great improvement in different performances of a conventional thermal recording device of nichrome wire type.

We claim:

1. A thermal pen of the thick film type for thermal recording, comprising a thermal pen tip and a thermal pen tip holder connected to said thermal pen tip for holding the thermal pen tip, said thermal pen tip comprising a high resistance, low thermal-conductivity, planar substrate formed in the form of a pen point and having a rectangular cross section, a heater element in the form of a thick film having a flat top surface on a portion of the end surface of the pen point of said high resistance, low thermal-conductivity, planar substrate, a generally semispherically prefabricated minute recording piece having a flat bottom surface and made of a heat-resistant, wear-resistant material having a thermal-conductivity substantially equal to or higher than that of said substrate, said recording piece being attached at its flat bottom surface to a portion of said flat top surface of said heater element and being adapted to be heated by said heater element for performing the thermal recording, and an electrical conductor in the form of a thick film so as to connect to said heater element of the high resistance substrate, said thermal pen tip holder and said planar substrate arranged so that during said thermal recording said substrate moves in the direction of the longitudinal length of said rectangular cross section.

2. A thermal pen as set forth in claim 1 having a heat-resistant protective coating applied thereon so as to cover the pen point.

3. A thermal pen as set forth in claim 1 in which said heater element is provided thereon with a heat-resistant, wear-resistant heat-sensitive recording piece of a given configuration in a heat conductive relation to said heater element.

4. A thermal pen as set forth in claim 3 in which said heat-sensitive recording piece is formed in advance in said given configuration and provided on said heater element through an adhesive layer.

5. A thermal pen as set forth in claim 4 in which said heat-sensitive recording piece is a body of semispherical, conical or columnar shape, a square pillar, a flat plate or the like.

6. A thermal pen as set forth in claim 3 in which said heat-sensitive recording piece is made of a material having a heat transfer rate substantially equal to or higher than that of said high resistance substrate.

7. A thermal pen as set forth in claim 1, wherein said recording piece has a conical shape, said conical shape recording piece being attached at its bottom surface to said portion of the top surface of said heater element.

8. A thermal pen as set forth in claim 1, wherein said recording piece is made of a ceramic material.

* * * * *